No. 831,551. PATENTED SEPT. 25, 1906.
C. W. GUTTZEIT.
CLAMPING JOINT FOR DRILLS.
APPLICATION FILED JAN. 26, 1906.
2 SHEETS—SHEET 1.
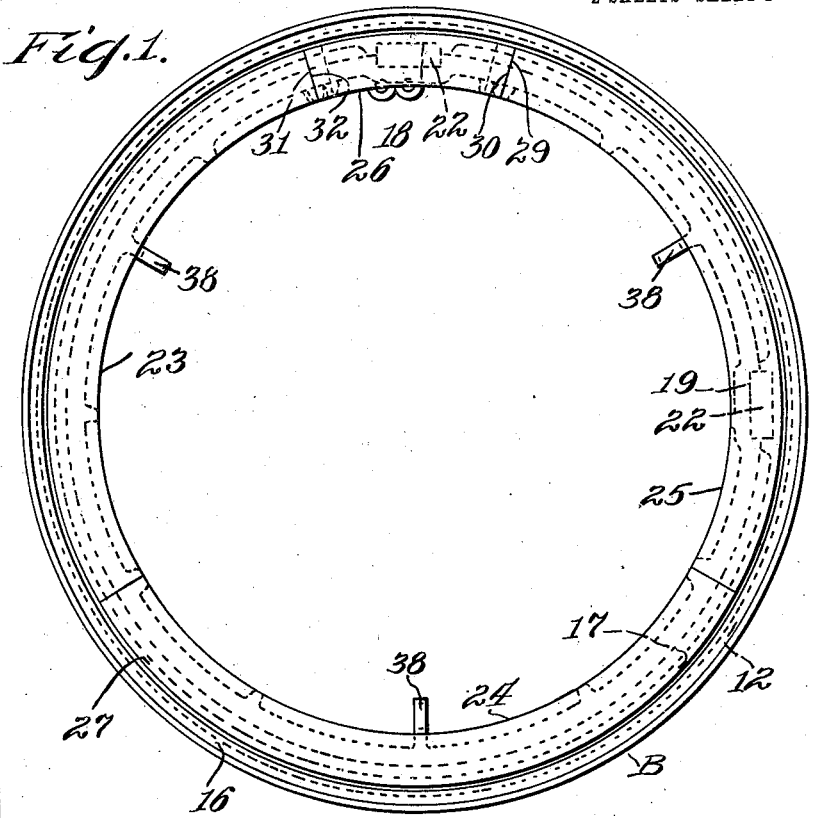
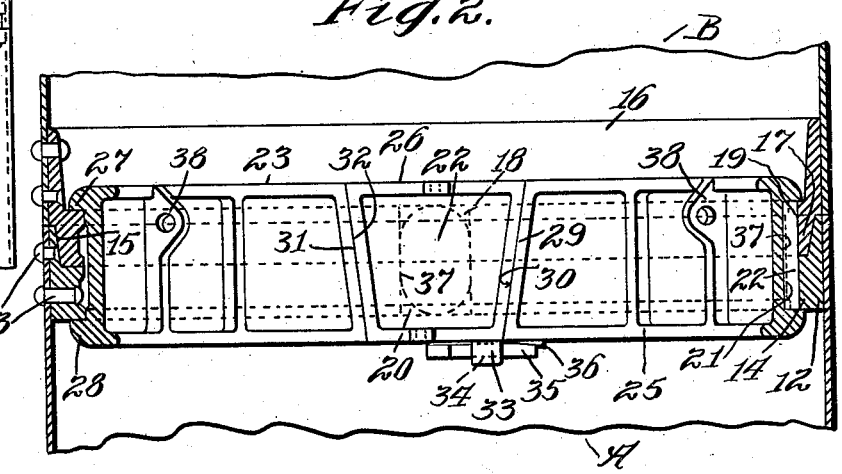
Witnesses:
C. C. Suss.
W. H. Reid.
Inventor:
Charles W. Guttzeit,
By his attorney,
F. H. Richards.

No. 831,551. PATENTED SEPT. 25, 1906.
C. W. GUTTZEIT.
CLAMPING JOINT FOR DRILLS.
APPLICATION FILED JAN. 26, 1906.
2 SHEETS—SHEET 2.
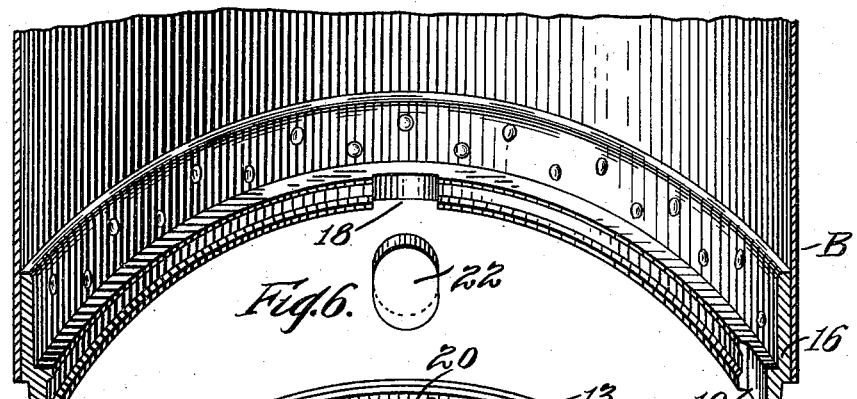
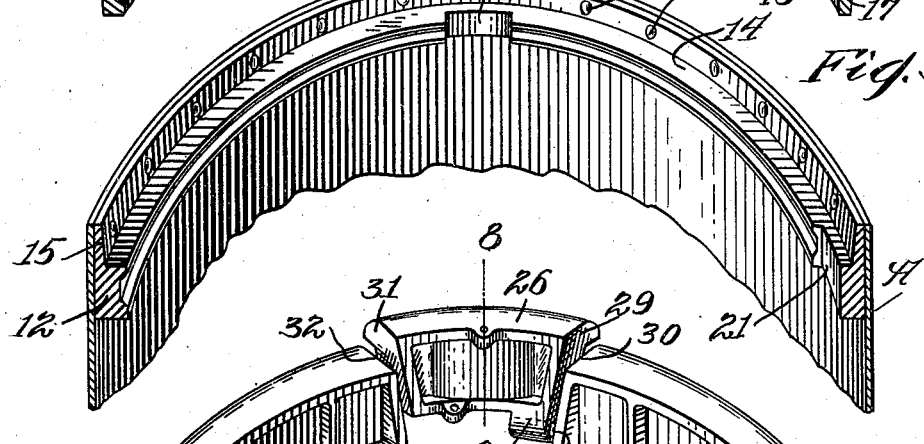
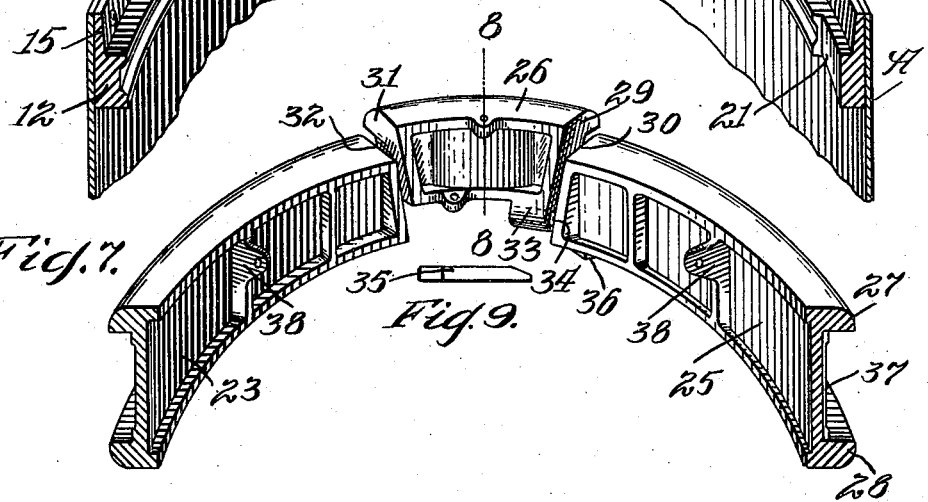
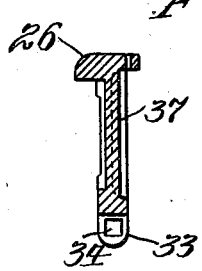
Witnesses:
G. G. Fuss.
W. H. Reid.
Inventor:
Charles W. Guttzeit,
By his attorney,
F. H. Richards.

UNITED STATES PATENT OFFICE.

CHARLES W. GUTTZEIT, OF HIGH BRIDGE, NEW JERSEY.

CLAMPING-JOINT FOR DRILLS.

No. 831,551.  Specification of Letters Patent.  Patented Sept. 25, 1906.

Application filed January 26, 1906. Serial No. 298,024.

*To all whom it may concern:*

Be it known that I, CHARLES W. GUTTZEIT, a citizen of the United States, residing in High Bridge, in the county of Hunterdon and State of New Jersey, have invented certain new and useful Improvements in Clamping-Joints for Drills, of which the following is a specification.

This invention has reference to means for coupling or clamping together two tubular or cylindrical members, and is especially designed to removably connect the sections of the hollow shafting or pipes of large diameters, such as used in rotary drills and similar devices.

The object of the present invention is to provide a clamping structure of the class referred to that can be simply and rapidly connected and will retain the sections together with the necessary strength and rigidity and which also can be very readily and quickly disconnected when it is desired to separate the sections.

In the drawings representing one embodiment of my invention, Figure 1 is an end elevation of two connected pipe-sections. Fig. 2 represents an axial section through the pipe connection. Fig. 3 is a side elevation showing two pipe-joints in reduced scale. Fig. 4 shows in perspective the inner arrangement of one of the pipe-sections. Fig. 5 is a similar view of the complemental pipe-section. Fig. 6 shows a key for preventing relative rotation of the connection-sections. Fig. 7 shows in perspective a half of a segmental ring with the locking-segment partly inserted. Fig. 8 is a transverse section through the wedge-segment on the line 8 8 of Fig. 7, and Fig. 9 shows the wedge-pin for locking the wedge-segment in position.

Heretofore it has been the practice to connect pipe-sections of large diameter for drill-rods and similar purposes by having internal flanges that are secured together by bolts. In such construction it is necessary to use a large number of bolts, which requires considerable time to place in position. The bolts have to be large and very strong, as the strain, both tensile and shearing, is excessive. Furthermore, as these pipes are immersed in water for long periods the bolts become rusted in place, so that when it is required to disconnect the sections it is practically impossible to unscrew and remove the bolts, and they must be cut out and new bolts used. Furthermore, even to unscrew such a number of bolts would require considerable time. To overcome these defects and others, the present invention provides a segmental coupling ring or member that is provided with means for expanding it to effect engagement between the ring and the pipe-sections. To clamp the sections together, one of the ring-segments has a wedge engagement with the adjacent segments, whereby the ring is expanded and clamped in position by the simple act of merely driving home this wedge-segment. A wedge-pin may be also used to connect the wedge-segment with one adjacent segment of the ring to lock the segment in position. By the mere operation of assembling the ring-segments in position, then inserting the wedge-segment to expand the ring, and then inserting the wedge-pin the coupling is effected. To disconnect the pipe-sections, all that is required is to drive out the wedge-pin to unlock the wedge-segment and then remove the wedge-segment, whereupon the remaining segments of the ring can be removed to free the pipe-sections. Should the wedge-pin become rusted fast, it can be very quickly cut off by a saw or cold-chisel. The torsional strain between the pipe-sections is taken by one or more keys inserted in alining slots in the internal flanges of the pipe-sections.

Referring now to the drawings, each of the pipe-sections A and B is provided with an internal flange adjacent the end portion. The section A has a ring member 12 suitably secured inside at one end, as by rivets 13, which ring has an internal flange portion 14, the outer portion 15 being made slightly tapering, as shown. The pipe-section B has a ring 16, provided with a flange portion 17, that extends inward, and also projects beyond the end of the pipe, as shown in Fig. 4. This flange extension is arranged to fit into the portion 15 of the ring 12 when the pipe sections are brought together, as shown in Fig. 2, from which it will be seen that the two flange portions 17 and 14 are abutting and are in alinement. To prevent relative rotation of the pipe-sections, the flange 16 is provided with slots 18 and 19, that register, respectively, with slots 20 and 21 in the flange 14. Suitable keys 22 are fitted in these registering slots and prevent lateral movement of the sections.

A clamping-ring is formed of a number of segments and is shown as comprising four segments 23, 24, 25, and 26, which are complemental to constitute a complete annular ring, as shown. Obviously the ring may be formed of a greater or less number of complemental sections. The ring as a whole is provided with an external flange 27 at one end and a similar flange 28 at the other end, as shown in Figs. 2 and 7; but the segment 26 is not provided with the flange portion 28, as shown in Fig. 8. The abutting ends of the several segments are arranged in planes intersecting the axis of the pipe-sections, excepting the abutting ends of the segment 26 with the segments 23 and 25. The ring-segment 26 has its end face 29 inclined, as shown in Fig. 7, and the abutting end 30 of the ring-segment 25 is correspondingly inclined, as shown. The other end 31 of the ring-segment 26 is inclined, but in the opposite direction to that of the end 29, thereby forming a wedge member of this segment. The abutting end 32 of the segment 23 is inclined corresponding to that of the inclined face 31 of the wedge-segment.

The distance apart of the flanges 27 and 28 of the ring-segments is equal to the combined thickness of the flanges 14 and 17, as indicated in Fig. 2, and the diameter of the segmental ring between the flanges is the same as the internal diameter of the section-flanges 14 and 17.

To assemble the pipe-sections, the ends are brought together and the pipe-segments 23, 24, and 25 are placed in position with the section 24 abutting the other two sections. Thereupon the wedge-segment is inserted in a longitudinal direction between the segments 23 and 25, as indicated in Fig. 7, when the engaging inclined faces of these three segments will expand the ring to tightly engage the flanges 14 and 17 of the pipe-sections, thereby securing the latter together. The segments are so formed that when the wedge-segment 26 is driven home it will aline with the other segments, as indicated in Fig. 2.

It is desirable to lock the wedge-segment in this position by suitable means. The segment 26 is shown as provided with an extension 33, containing an aperture 34, into which is inserted a wedge-pin 35. (Shown separately in Fig. 9.) The segment 25 may be provided with an inclined extension 36 to engage the wedge-pin and serve to lock the latter in position.

The key 22 is inserted in a recess portion 37 in the rear of the wedge-segment 26 before the latter is placed in position and will be thereby retained in position to lock the segments against lateral movement by engagement with the walls of the slots 18 and 20. Any other keys that are used to engage similar registering slots in the flanges 14 and 17 are retained in position by being located between the flanges 27 and 28 of the ring-segments.

When it is desired to disconnect the pipe-sections, it is only necessary to drive out the wedge-pin 35 and remove the wedge-segment 26, whereupon the other segments of the ring can be moved inward to disengage the flanges of the pipe-sections and removed. To facilitate the handling of the ring-segments, which are rather cumbersome with such large structures, apertured lugs 38 may be formed on the segments to be engaged by suitable lifting devices.

Having thus described my invention, I claim—

1. In a pipe-coupling, the combination of two pipe-sections provided with internal projections, a segmental clamping-ring provided with external projections organized to engage said projections of the pipe-sections and clamp them together, and means for expanding the segmental ring to retain it in clamping position.

2. In a pipe-coupling, the combination of two pipe-sections provided with internal projections, a segmental clamping-ring provided with external projections organized to engage said projections of the pipe-sections and clamp them together, means for expanding the segmental ring to retain it in clamping position and means for locking the expanding member in position.

3. In a pipe-coupling, the combination of two pipe-sections each provided with internal projections, a segmental clamping-ring provided with external projections organized to engage said projections of the pipe-sections and clamp them together, means for expanding the segmental ring to retain it in locking position, the projections of the pipe-sections being provided with registering slots, and a key member inserted in said slots to prevent relative rotary movement of the pipe-sections.

4. In a pipe-coupling, the combination of two pipe-sections provided with internal projections, a segmental clamping-ring provided with external projections organized to engage the projections of the pipe-sections to clamp the sections together, one of the segments of the ring having a wedge engagement with the abutting segments to expand the ring when forced into position.

5. In a pipe-coupling, the combination of two pipe-sections each provided with internal projections, a segmental clamping-ring provided with external projections organized to engage the projections of the pipe-sections to clamp the sections together, one of the segments of the ring having a wedge engagement with the abutting segments to expand the ring when forced into position, and means for locking the wedge-section in position.

6. In a pipe-coupling, the combination of two pipe-sections provided with internal projections, a segmental clamping-ring provided with external projections and organized to engage the projections of the pipe-sections to clamp the sections together, one of the segments of the ring having a wedge engagement with the abutting segments to expand the ring when forced into position, and a wedge member arranged to lock said section in position.

7. In a pipe-coupling, the combination of two pipe-sections provided with internal projections, a segmental clamping-ring provided with external projections and organized to engage the projections of the pipe-sections to clamp the sections together, one of the segments of the ring having a wedge engagement with the abutting segments to expand the ring when forced into position, the wedge segment having an apertured extension on its inserting-face, and a fastening member inserted through the extension and engaging the adjacent segment to prevent removal of the wedge-segment.

8. In a pipe-coupling, the combination of two pipe-sections provided with internal projections, a segmental clamping-ring provided with external flanges and organized to engage the projections of the pipe-sections to clamp the sections together, one of the segments of the ring having a wedge engagement with the abutting segments to expand the ring when forced into position, said projections of the pipe-sections being provided with registering slots, and a key member inserted in said slots to prevent relative rotary movement of the pipe-sections.

9. In a pipe-coupling, the combination of two pipe-sections each provided with an internal flange, a segmental clamping-ring provided with two external flanges organized to engage the flanges of the pipe-sections between its flanges to clamp the pipe-sections together, and means for expanding the segmental ring to lock it in engaging position.

10. In a pipe-coupling, the combination of two pipe-sections each provided with an internal flange, a segmental clamping-ring provided with two external flanges and organized to engage the flanges of the pipe-sections to clamp the sections together, one of the segments of the ring having a wedge engagement with the abutting segments to expand the ring when forced into position.

11. In a pipe-coupling, the combination of two pipe-sections each provided with an internal flange, a segmental clamping-ring provided with two external flanges and organized to engage the flanges of the pipe-sections to clamp the sections together, one of the segments of the ring having a wedge engagement with the abutting segments to expand the ring when forced into position, and means for locking said section in position.

12. In a pipe-coupling, the combination of two pipe-sections each provided with an internal flange, a segmental clamping-ring provided with two external flanges and organized to engage the flanges of the pipe-sections to clamp the sections together, one of the segments of the ring having a wedge engagement with the abutting segments to expand the ring when forced into position, and a wedge member arranged to lock said section in position.

13. In a pipe-coupling, the combination of two pipe sections provided with internal projections, a segmental clamping-ring provided with external projections and organized to engage the projections of the pipe-sections to clamp the sections together, one of the segments of the ring having a wedge engagement with the abutting segments to expand the ring when forced into position, said projections of the pipe-sections being provided with registering slots and a key member inserted in said slots to prevent relative rotary movement of the pipe-sections, and retained in position by one of the ring-segments.

14. In a pipe-coupling, the combination of two pipe-sections provided with internal projections, a segmental clamping-ring provided with external projections and organized to engage the projections of the pipe-sections to clamp the sections together, one of the segments of the ring having a wedge engagement with the abutting segments to expand the ring when forced into position, said projections of the pipe-sections being provided with registering slots and a key member inserted in said slots to prevent relative rotary movement of the pipe-sections, and retained in position by said wedge member.

15. In a pipe-coupling, the combination of two pipe-sections provided with internal projections, a segmental ring provided with external projections organized to engage said flanges to clamp the pipe-sections together, one of the ring-segments having its abutting ends inclined to form a wedge member, the adjacent segments having their ends abutting said segment correspondingly inclined, whereby the insertion of the wedge-segment will expand the ring and lock it in retaining position.

16. In a pipe-coupling, the combination of two pipe-sections provided with internal projections, a segmental ring provided with external projections organized to engage said projections to clamp the pipe-sections together, one of the ring-segments having its abutting ends inclined to form a wedge member, the adjacent segments having their ends abutting said segment correspondingly inclined, whereby the insertion of the wedge-segment will expand the ring and lock it in retaining position, and means for locking the wedge-segment in position.

17. In a pipe-coupling, the combination of two pipe-sections provided with internal projections, a segmental ring provided with external projections organized to engage said projections to clamp the pipe-sections together, one of the ring-segments having its abutting ends inclined to form a wedge member, the adjacent segments having their ends abutting said segment correspondingly inclined, whereby the insertion of the wedge-segment will expand the ring and lock it in retaining position, and a wedge member arranged to lock the wedge-segment in retaining position.

18. In a pipe-coupling, the combination of two pipe-sections provided with internal projections, a segmental ring provided with external projections organized to engage said flanges to clamp the pipe-sections together, one of the ring-segments having its abutting ends inclined to form a wedge member, the adjacent sections having their ends abutting said segment correspondingly inclined, whereby the insertion of the wedge-segment will expand the ring and lock it in retaining position, the wedge member having an apertured extension on its entering face adjacent one end, a wedge-pin passing through said extension and engaging the adjacent segment, the latter segment having tapering portion coacting with the wedge-pin to lock it in position.

19. In a pipe-coupling, the combination of two pipe-sections, a segmental clamping-ring inside of the pipe-sections, means for expanding the segmental ring, and means for engagement between the ring and pipe-section to clamp the sections together upon the expansion of the ring.

20. In a pipe-coupling, the combination of two pipe-sections, a segmental clamping-ring inside of the pipe-sections, means for expanding the ring, means for engagement between the ring and pipe-sections to clamp the section together, and means for locking the expanding means in position.

CHARLES W. GUTTZEIT.

Witnesses:
HENRY D. HIBBARD,
CLARENCE LYONS.